Patented Jan. 3, 1933

1,892,857

UNITED STATES PATENT OFFICE

ERWIN F. SPELLMEYER, OF EAST ORANGE, NEW JERSEY

COMPOSITION FOR PREVENTING BOILER PRIMING OR FROTHING

No Drawing.    Application filed December 15, 1931. Serial No. 581,272.

This invention relates, generally, to preparations or compositions which are added to hard boiler waters to prevent the priming or frothing thereof, and the invention has reference, more particularly, to a novel composition intended to be used for this purpose.

In many parts of this and other countries, the only waters obtainable for steam boiler purposes are of such a nature that they cannot be used in boilers because they froth excessively and thereby cause priming, or a boiling over of the contents of the boiler into the steam mains causing serious complications. This priming or frothing of the waters is due to the presence of a relatively high percentage of solids dissolved in them, which solids commonly consist of magnesium chloride and sulphate, calcium chloride and sulphate, sodium chloride and sulphate, carbonates, bicarbonates and other combinations of these chemicals. According to the consensus of opinion, the presence of these solids alters or raises the surface tension of the boiling boiler water containing them, so that generated steam cannot readily break through the water surface and therefore tends to bodily carry quantities of water in the form of froth along with the same into the steam mains.

Heretofore, use has been made of organic oils and fats, such as castor oil, tallow, and sulphonated fats which substances are added to the boiler water and serve by reducing the boiler water surface tension to substantially reduce priming or frothing of the water. However, these substances have not proved satisfactory because of the relative ease with which they break down at boiler temperatures and pressures and are distilled over into the mains. The heat of the boiler water rapidly disintegrates these substances by hydrolysis and tends to saponify the same so that they are converted into soaps, which act to even further increase boiler priming or frothing. In other words, these fats and oils are satisfactory for relatively short periods, i. e. for example, a matter of an hour or so, but thereafter they rapidly break down and cause even greater frothing than would have occurred if they had not been used.

The principal object of the present invention is to provide a novel substance or composition for use in boilers employing hard waters, which substance or composition is of such character that a relatively small quantity of the same when added to boiler water, will serve to prevent frothing or priming of the boiler, the said substance or composition being extremely stable when subjected to high degrees of heat and pressure obtaining in a boiler.

Another object of the present invention lies in the provision of a novel composition of the above character, which, when inserted into steam boilers, possesses the property of reducing the surface tension of the boiler water over a considerable period of time, and at the same time prevents the boilers, while in operation, from priming, even though these boilers employ waters which, under ordinary conditions, could not be used at all.

Other objects of the present invention not at this time more particularly enumerated will be clearly understood from the following detailed description of the same.

Applicant, as the result of experimentation and tests, has found that the fatty acid amides possess the faculty of reducing the surface tension of boiler waters and, owing to the relative stability of these fatty acid amides at high temperatures and pressures, they have been found to serve the function of preventing boiler priming or frothing very satisfactorily. The fatty acid amides will prevent frothing in boiler waters even when used in very small quantity. They decompose, if at all, with but extreme slowness even under high steam temperature and pressure conditions. They possess the property of reducing the surface tension of the water over a considerable period of time and enable the use of extremely hard waters which, under ordinary conditions, could not be used in boilers.

The applicant has found from experimentation that all of the fatty acid amides possess the peculiar quality which enables them to reduce the surface tension of water and all of these fatty acid amides may be used in boilers to prevent priming. As is well known, all of the fatty acids can be converted into corresponding fatty acid amides as the result of the chemical combination of the fatty acids with the ammonium radical or amido group (NH$_2$) which takes the place of the hydroxyl radical of the fatty acid. Applicant has found that certain of the fatty acid amides serve the function of reducing boiler water surface tension particularly well, for example, stearamide is applicant's preferred fatty acid amide for accomplishing his purposes. When stearamide is added to boiler water in relatively small qauntity, the exact quantity depending upon the relative hardness of the water, it has been found that boiler frothing or priming is eliminated for a relatively long period of time. Also, it has been found that two other fatty acid amides, namely, oleamide and palmatamide serve very well as compositions for preventing boiler priming. These three fatty acid amides, stearamide, oleamide and palmatamide have high melting and boiling points so that they are not materially affected by high boiler temperatures and pressures. These amides are substantially unaffected by water at high temperatures and therefore are very stable and serve their function of retarding boiling priming with great efficiency.

It will be apparent that applicant may intermix two or more of the fatty acid amides in preparing his composition. Although all of the fatty acid amides possess the quality of reducing the surface tension of hard boiler waters, yet some of these amides have relatively low vaporization temperatures and consequently are not desirable for use in boilers employing high temperatures and pressures. The three fatty acid amides heretofore specified and others having high melting points are eminently satisfactory in use, however. Applicant has found that amides of acids, other than the fatty acids, do not possess the faculty of reducing the surface tension of hard waters and do not reduce frothing, and are therefore unsatisfactory for his purposes.

What is claimed is:

1. A boiler liquid comprising, a mixture of hard water and a fatty acid amide.

2. A boiler liquid comprising, a mixture of hard water and fatty acid amides having high melting points, said amides serving to reduce the priming or frothing of said hard water.

3. The method of treating boiler waters for retarding boiler priming or frothing, consisting in adding a fatty acid amide to the boiler waters.

4. The method of treating boiler waters for retarding boiler priming or frothing, consisting in adding stearamide to the boiler waters.

5. The method of treating boiler waters for retarding boiler priming or frothing, consisting in adding oleamide to the boiler waters.

6. The method of treating boiler waters for retarding boiler priming or frothing, consisting in adding palmatamide to the boiler waters.

In testimony, that I claim the invention set forth above I have hereunto set my hand this 11th day of December 1931.

ERWIN F. SPELLMEYER.